US010077699B2

(12) United States Patent
Minezawa et al.

(10) Patent No.: US 10,077,699 B2
(45) Date of Patent: Sep. 18, 2018

(54) EXHAUST PURIFYING SYSTEM

(71) Applicant: ISUZU MOTORS LIMITED, Tokyo (JP)

(72) Inventors: Masanobu Minezawa, Fujisawa (JP); Tomoyuki Kamijyou, Fujisawa (JP); Akihiro Sawada, Fujisawa (JP)

(73) Assignee: ISUZU MOTORS LIMITED, Tokyo (JP)

( * ) Notice: Subject to any disclaimer, the term of this patent is extended or adjusted under 35 U.S.C. 154(b) by 0 days.

(21) Appl. No.: 15/306,455

(22) PCT Filed: Apr. 16, 2015

(86) PCT No.: PCT/JP2015/061734
§ 371 (c)(1),
(2) Date: Oct. 24, 2016

(87) PCT Pub. No.: WO2015/163235
PCT Pub. Date: Oct. 29, 2015

(65) Prior Publication Data
US 2017/0044950 A1 Feb. 16, 2017

(30) Foreign Application Priority Data

Apr. 24, 2014 (JP) ................. 2014-090064

(51) Int. Cl.
*F01N 3/20* (2006.01)
*B01D 53/94* (2006.01)
*F01N 3/08* (2006.01)

(52) U.S. Cl.
CPC ......... *F01N 3/208* (2013.01); *B01D 53/9409* (2013.01); *B01D 53/9495* (2013.01);
(Continued)

(58) Field of Classification Search
None
See application file for complete search history.

(56) References Cited

U.S. PATENT DOCUMENTS

2003/0182935 A1 10/2003 Kawai et al.
2009/0235646 A1 9/2009 Nagaoka et al.
(Continued)

FOREIGN PATENT DOCUMENTS

CN 101142381 A 3/2008
CN 101965440 A 2/2011
(Continued)

OTHER PUBLICATIONS

International Search Report and Written Opinion for PCT App No. PCT/JP2015/061734 dated Jul. 7, 2015, 11 pgs.
(Continued)

*Primary Examiner* — Walter Dean Griffin
*Assistant Examiner* — Jelitza M Perez
(74) *Attorney, Agent, or Firm* — Procopio, Cory, Hargreaves & Savitch LLP

(57) ABSTRACT

An exhaust purification system can prevent a $NH_3$ slip caused by an excessive injection of urea water, and includes: an SCR that purifies NOx contained in an exhaust gas using ammonia, as a reducing agent, produced from urea water; a urea water injection device that injects the urea water into an exhaust passage upstream from the SCR; an estimated-adsorption-amount calculation unit that calculates an estimated adsorption amount of the ammonia adsorbed in the SCR; an injection control unit that executes an injection control of the urea water injection device based on the estimated adsorption amount; and an estimated-adsorption-amount change unit that changes the estimated adsorption amount used for the injection control into a value increased or decreased by a predetermined amount when a predetermined condition is established that can cause a difference between an actual adsorption amount of the ammonia adsorbed in the SCR and the estimated adsorption amount.

2 Claims, 3 Drawing Sheets

(52) U.S. Cl.
CPC ............ *F01N 3/08* (2013.01); *F01N 2610/02* (2013.01); *F01N 2900/0601* (2013.01); *F01N 2900/16* (2013.01)

(56) References Cited

U.S. PATENT DOCUMENTS

| | | |
|---|---|---|
| 2009/0288397 A1 | 11/2009 | Shimomura et al. |
| 2010/0050611 A1 | 3/2010 | Walz et al. |
| 2010/0257844 A1 | 10/2010 | Shimomura et al. |
| 2011/0041481 A1 | 2/2011 | Fujita |
| 2011/0203259 A1 | 8/2011 | Upadhyay et al. |
| 2013/0025264 A1 | 1/2013 | Nagaoka et al. |
| 2013/0247543 A1 | 9/2013 | Hirota et al. |

FOREIGN PATENT DOCUMENTS

| | | |
|---|---|---|
| CN | 102844532 A | 12/2012 |
| JP | 2003-293737 A | 10/2003 |
| JP | 2009-281350 A | 12/2009 |
| JP | 2010-248963 A | 11/2010 |
| JP | 2010-261423 A | 11/2010 |
| JP | 2012-067667 A | 4/2012 |
| WO | 2014050445 A1 | 4/2014 |

OTHER PUBLICATIONS

Extended European Search Report for related EP application No. 15783325.2, dated Jan. 4, 2018, 7 pages.
The First Office Action for CN App No. 201580021218.8 dated Jul. 4, 2018, 10 pgs.

EXHAUST PURIFYING SYSTEM

CROSS-REFERENCE TO RELATED APPLICATIONS

This application is a U.S. National Stage entry of PCT Application No. PCT/JP2015/061734, filed on Apr. 16, 2015, which claims priority to JP Application No. 2014-090064 filed Apr. 24, 2014. The contents of the foregoing are incorporated by reference.

TECHNICAL FIELD

The present invention relates to an exhaust purifying system, and more particularly, to an exhaust purifying system including a selective catalytic reduction (hereinafter, referred to as an SCR) that reduces and purifies NOx contained in an exhaust gas.

RELATED ART

In the related art, there is known an exhaust purifying system including an SCR that selectively reduces and purifies NOx contained in an exhaust gas using ammonia (hereinafter, referred to as $NH_3$) as a reducing agent, the $NH_3$ being generated by hydrolysis from urea water. As such an exhaust purifying system, for example, techniques are disclosed in Patent Documents 1 and 2 in which the injection amount of urea water is controlled depending a difference between the estimated adsorption amount and the target adsorption amount of $NH_3$ with respect to an SCR calculated based on sensor values of various sensors.

RELATED ART DOCUMENTS

Patent Documents

[Patent Document 1]: Japanese Unexamined Patent Application Publication No. 2003-293737
[Patent Document 2]: Japanese Unexamined Patent Application Publication No. 2012-067667

DISCLOSURE OF THE INVENTION

Problem that the Invention is to Solve

Incidentally, when a temporary defect frequently occurs or when an operation state in which in the NOx purification rate is low has continued, the actual adsorption amount of NH3 adsorbed in the SCR is sometimes greater than the estimated adsorption amount of $NH_3$. In such a state, when an injection of urea water is controlled based on the estimated adsorption amount of $NH_3$, there is a possibility to cause a so-called $NH_3$ slip, that is, a release of excess $NH_3$, because the injection amount of urea water becomes excessive with respect to adsorption capability of $NH_3$ in the SCR.

In addition, when the injection amount of urea water is excessive, some of the urea water which has not been treated with the SCR may adhere to an exhaust pipe or the SCR, thereby causing corrosion of the exhaust pipe or performance deterioration of the SCR.

An object of the invention is to prevent a $NH_3$ slip due to the excessive injection of urea water by effective suppression of the difference between the estimated adsorption amount of $NH_3$ and the actual adsorption amount of $NH_3$.

Means for Solving the Problem

In order to achieve the above object, an exhaust purifying system of the invention includes: a selective catalytic reduction that is provided in an exhaust passage of an internal combustion engine to purify NOx contained in an exhaust gas using ammonia, as a reducing agent, produced from urea water; a urea water injection unit that injects the urea water into a portion of the exhaust passage which is upstream from the selective catalytic reduction; an estimated-adsorption-amount calculation unit that calculates an estimated adsorption amount of the ammonia adsorbed in the selective catalytic reduction; an injection control unit that executes an injection control of the urea water injection unit based on the estimated adsorption amount; and an estimated-adsorption-amount change unit that changes the estimated adsorption amount used for the injection control into a value increased or decreased by a predetermined amount when a predetermined condition is established that can cause a difference between an actual adsorption amount of the ammonia adsorbed in the selective catalytic reduction and the estimated adsorption amount.

The exhaust purifying system may further include: a purification-rate-decrease determination unit that determines whether an NOx purification rate of the selective catalytic reduction is decreased due to the increase or decrease of the estimated adsorption amount; and an estimated-adsorption-amount maintaining unit that maintains the value changed by the estimated-adsorption-amount change unit when the purification-rate-decrease determination unit determines that the NOx purification rate is not decreased.

The exhaust purifying system may further include an estimated-adsorption-amount correction unit that returns the value changed by the estimated-adsorption-amount change unit to the value before the change when the purification-rate-decrease determination unit determines that the NOx purification rate has been decreased.

The exhaust purifying system may further include an estimated-adsorption amount-correction unit that corrects the value changed by the estimated-adsorption-amount change unit to an estimated adsorption amount calculated based on a current NOx purification rate when the purification-rate-decrease determination unit determines that the NOx purification rate has been decreased.

DETAILED DESCRIPTION

Figure 1:
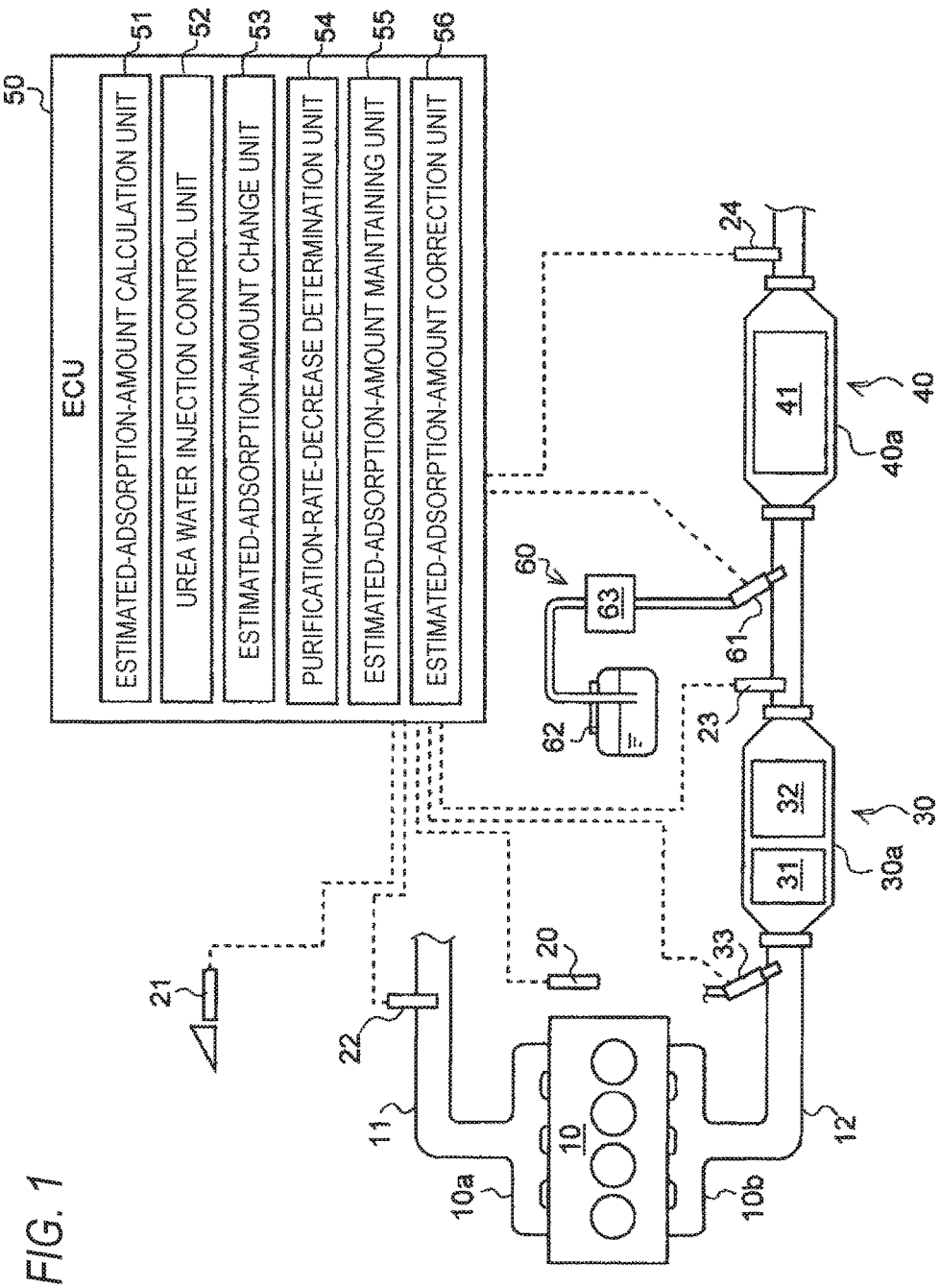
FIG. 1 is a schematic overall configuration diagram illustrating an exhaust purifying system according to an embodiment of the invention.

Hereinafter, an exhaust purifying system according to an embodiment of the present invention will be described with reference to the accompanying drawings. Identical components are designated by identical reference numerals, and such identical components have like names and functions. Accordingly, detailed descriptions of such identical components will not be repeated.

As illustrated in FIG. 1, an intake passage 11 is connected to an intake manifold 10a of an diesel engine (hereinafter, simply referred to as an engine) 10, and an exhaust passage 12 is connected to the exhaust manifold 10b. The exhaust passage 12 is provided with a upstream post-treatment device 30, a downstream post-treatment device 40, and so on in this order from the upstream side in the exhaust gas flowing direction.

In FIG. 1, reference numeral 20 denotes an engine speed sensor, reference numeral 21 denotes an accelerator opening degree sensor, reference numeral 22 denotes an MAF sensor, reference numeral 23 denotes an exhaust-gas temperature sensor, and reference numeral 24 denotes an NOx sensor. Sensor values of these various sensors 20 to 24 are transmitted to an electronic control unit (hereinafter, referred to as ECU) 50 that is electrically connected thereto.

The upstream post-treatment device 30 includes a catalyst casing 30a, and an oxidation catalyst (hereinafter, referred to as DOC) 31 and DPF 32 are disposed in the catalyst casing 30a in this order from the upstream side. In addition, an fuel injection device (fuel adding valve) 33 is provided at the exhaust passage 12 upstream from the DOC 31.

The fuel injection device 33 injects unburnt fuel (mainly HC) into the exhaust passage 12 in response to an instruction signal input from the ECU 50. It should be noted that in a case where post-injection by means of multi-stage injection of the engine 10 is employed, the fuel injection device 33 may be omitted.

The DOC 31 includes, for example, a ceramic carrier having a cordierite honeycomb structure, with catalytic components supported on a surface of the ceramic carrier. When the HC is supplied to the DOC 31 through the fuel injection device 33 or the post-injection, the DOC 31 oxidizes the HC thereby causing the temperature of the exhaust gas to rise.

The DPF 32 has, for example, a number of cells defined by porous partition walls and disposed along a flowing direction of the exhaust gas, the upstream and downstream sides of the cells being sealed alternately. The DPF 32 collects PM in the exhaust gas into pores and on the surfaces of the partition walls. When the amount of accumulated PM reaches a predetermined amount, so-called forced regeneration is carried out to burn and remove the accumulated PM. The forced regeneration is performed by supplying the unburnt fuel (HC) to the DOC 31 through the fuel injection device 33 or the post-injection and raising the temperature of the exhaust gas introducing into the DPF 32 up to a PM combustion temperature.

The downstream post-treatment device 40 is configured to include an SCR 41 in a casing 40a. A urea water injection device 60 is provided at the exhaust passage 12 upstream from the SCR 41.

The urea water injection device 60 opens and closes a urea adding valve 61 in response to the instruction signal input from the ECU 50, and thus injects urea water, which is pumped from the inside of a urea water tank 62 by a urea water pump 63, into the exhaust passage 12 upstream from the SCR 41. The injected urea water is hydrolyzed by the exhaust heat, whereby $NH_3$ is produced and supplied to the SCR 41 on the downstream side as a reducing agent.

The SCR 41 includes, for example, a ceramic carrier having a honeycomb structure, with zeolite or the like supported on a surface of the ceramic carrier. The SCR 41 includes a number of cells defined by porous partition walls. The SCR 41 adsorbs $NH_3$ supplied as the reducing agent, and selectively reduces and purifies NOx contained in the exhaust gas passing therethrough with the adsorbed $NH_3$.

The ECU 50 performs various types of control, such as control of the engine 10, the fuel injection device 33, and the urea water injection device 60, and includes a CPU, a ROM, a RAM, input ports, output ports, and so on which are known in the related art.

The ECU 50 includes, as part of its functional elements, an estimated-adsorption-amount calculation unit 51, a urea water injection control unit 52, an estimated-adsorption-amount change unit 53, a purification-rate-decrease determination unit 54, an estimated-adsorption-amount maintaining unit 55, and an estimated-adsorption-amount correction unit 56. It is assumed in the following description that all of these functional elements are included in the ECU 50, which is an integrated piece of hardware. Alternatively, one or more of these functional elements may be provided in a separate piece of hardware.

The estimated-adsorption-amount calculation unit 51 calculates the amount of $NH_3$ adsorbed currently in the SCR 41 (hereinafter, referred to as an estimated adsorption amount $NH_{3\ EST}$). More specifically, the estimated-adsorption-amount calculation unit 51 calculates a value of NOx contained in the exhaust gas (hereinafter, referred to as an SCR inlet NOx value) to be discharged from the engine 10, based on an operation state of the engine 10 detected by various sensors 20 to 23. Furthermore, it calculates the NOx purification rate of the SCR 41 based on the SCR inlet NOx value and an SCR outlet NOx value to be detected by the NOx sensor 24, and calculates also a total consumption amount of NFL consumed by the SCR 41 from the NOx purification rate. Then, the currently estimated adsorption amount $NH_{3\ EST}$ is calculated by subtraction of the total consumption amount of $NH_3$ from the total supply amount of $NH_3$ supplied to the SCR 41. As a calculation method of the estimated adsorption amount $NH_{3\ EST}$, for example, other known calculation methods can also be used.

Figure 2:
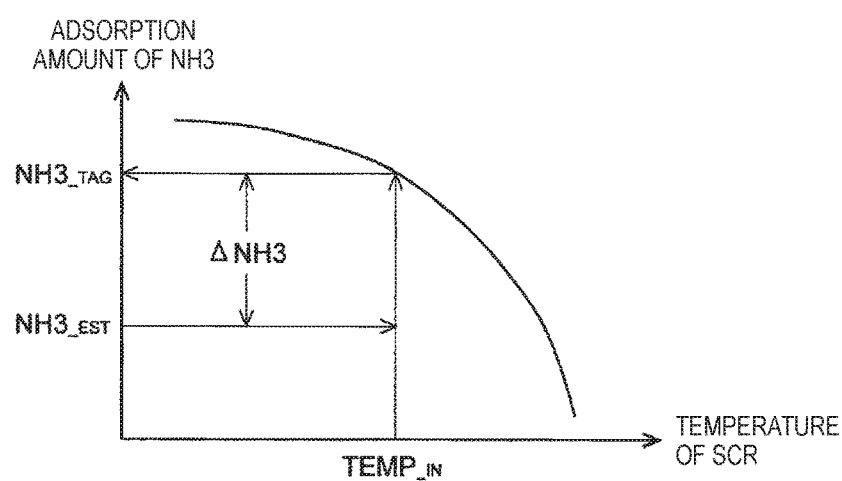
FIG. 2 is a diagram illustrating an example of a temperature-adsorption amount map according to the embodiment of the invention.

The urea water injection control unit 52 controls urea water injection of the urea water injection device 60 based on the estimated adsorption amount $NH_{3\ EST}$ calculated by the estimated-adsorption-amount calculation unit 51. More specifically, a temperature-adsorption amount map (see FIG. 2) is stored in the ECU 50, the map showing a relation between an internal temperature of SCR 41 prepared in advance and a target adsorption amount of $NH_3$. From the temperature-adsorption amount map, the urea water injection control unit 52 reads out a deviation $\Delta NH_3$ between a target adsorption amount $NH_{3\ TAG}$ corresponding to a sensor value $T_{SCRIN}$ of the exhaust temperature sensor 23 and the estimated adsorption amount $NH_{3\ EST}$, and also transmits an injection instruction signal of the amount of urea water equivalent to the deviation $\Delta NH_3$ to the urea water injection device 60. An example of the temperature-adsorption amount map illustrated in FIG. 2 may include a three-dimensional map showing a relation between an internal temperature of the SCR 41, the target adsorption amount of $NH_3$, and an exhaust flow rate.

The estimated-adsorption-amount change unit 53 executes a change control to increase the estimated adsorption amount $NH_{3\ EST}$, which is used for the injection control of urea water, by a predetermined amount α when a predetermined condition is established that can cause a difference between the estimated adsorption amount $NH_3$ EST and the actual adsorption amount of $NH_3$ adsorbed actually in the SCR 41 (hereinafter, the value obtained by the increase is referred to as an adsorption amount change value $NH_{3\ EST}+α$). When such a change control is executed, the deviation $\Delta NH_3$ to be read from the temperature-adsorption amount map (FIG. 2) becomes small, and the amount of urea water to be injected by the urea water injection device 60 is also decreased.

Examples of the predetermined conditions may include a case where the operation time of the engine 10 has elapsed for a predetermined long time after a forced regeneration of the DPF 32, a case where the decrease in the NOx purification rate has continued by the SCR 41 for a predetermined time, or a case where a temporary defect frequently occurs more than a predetermined number of times. In addition, as the predetermined amount α to be used for the change control, it is preferable that a specific magnification (for example, about 0.1%) set in advance or the offset amount (for example, about 0.1 a) is increased.

The purification-rate-decrease determination unit 54 determines whether the NOx purification rate of the SCR 41 is decreased after the increase of the estimated adsorption amount $NH_{3\ EST}$. The NOx purification rate of the SCR 41 before and after the increase may be obtained in such a manner of dividing the SCR outlet NOx value, which is detected by NOx sensor 24, by the SCR inlet NOx value calculated from the operation state of the engine 10.

When the purification-rate-decrease determination unit 54 determines that the NOx purification rate is not decreased, the estimated-adsorption-amount maintaining unit 55 execute a maintaining control to maintain the adsorption amount change value $NH_{3\ EST}+\alpha$, which is used for the injection control of urea water and obtained after the change, until the predetermined conditions described above are established again. When the NOx purification rate is not decreased, even though the estimated adsorption amount $NH_{3\ EST}$ is increased, it is considered that the adsorption amount change value $NH_{3\ EST}+\alpha$ obtained after the increase approximates to the actual adsorption amount of $NH_3$. When the maintaining control is executed in such a case, the injection amount of urea water can be optimized, and a slip of $NH_3$ can be effectively prevented.

When the purification-rate-decrease determination unit 54 determines that the NOx purification rate is decreased, the estimated-adsorption-amount correction unit 56 executes a correction control to return the adsorption amount change value $NH_{3\ EST}+\alpha$, which is used for the injection control of urea water and obtained after the change, to the estimated adsorption amount $NH_{3\ EST}$ before the change. When the NOx purification rate is decreased due to the increase of the estimated adsorption amount $NH_{3\ EST}$, it is considered that the estimated adsorption amount $NH_{3\ EST}$ before the increase approximates to the actual adsorption amount of $NH_3$. In such a case, by execution of the correction control to return the value obtained after the change to the value before the increase, the injection amount of urea water can be optimized, and a slip of $NH_3$ can be effectively prevented. The estimated-adsorption-amount correction unit 56 may be configured to correct the adsorption amount change value $NH_{3\ EST}+\alpha$ to a new adsorption amount update value $NH_{3\ REV}$ calculated from the current NOx purification rate.

Figure 3:
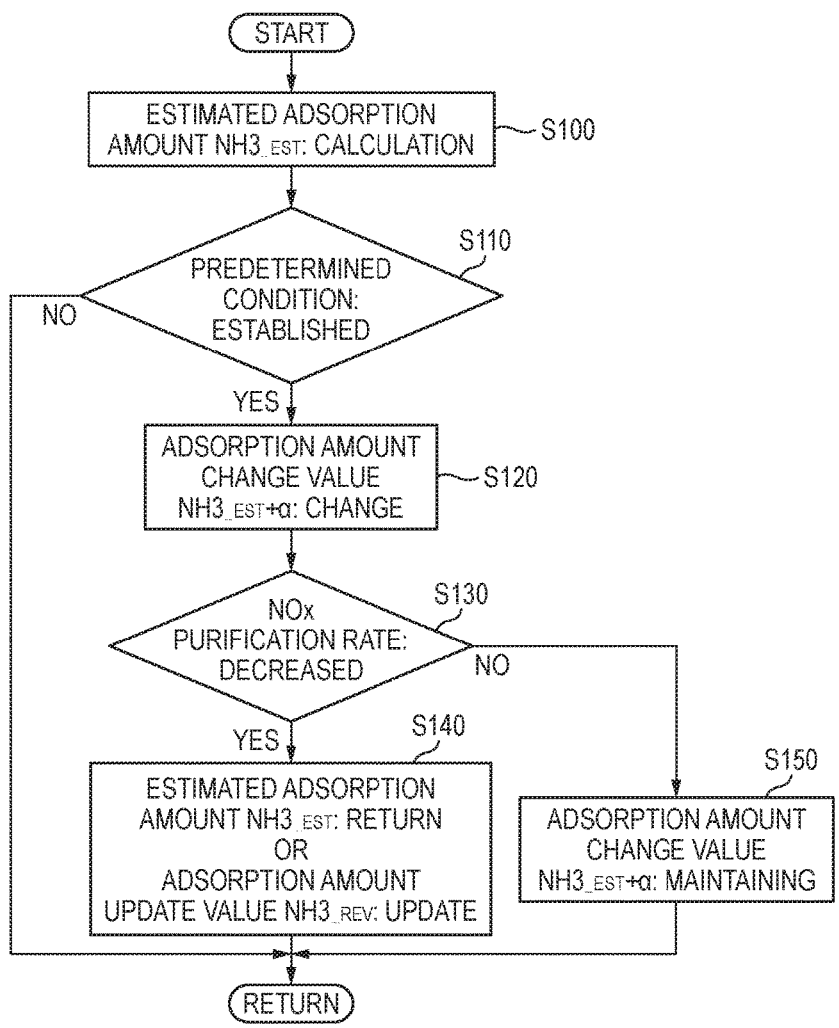
FIG. 3 is a flowchart illustrating an example of a control of the exhaust purifying system according to the embodiment of the present invention.

A control process of the exhaust purification system according to this embodiment will now be described below with reference to FIG. 3. The process illustrated in FIG. 3 is executed in parallel with the injection control of the urea water injection control unit 52.

In step 100 (hereinafter, the term "step" is abbreviated as S), the estimated adsorption amount $NH_{3\ EST}$ adsorbed in the SCR 41 is calculated. The estimated adsorption amount $NH_{3\ EST}$, which has been calculated, can be used for the injection control of the urea water injection control unit 52.

In S110, it is determined whether a predetermined condition is established that can cause a difference between the estimated adsorption amount $NH_{3\ EST}$ calculated in S100 and the actual adsorption amount of $NH_3$ adsorbed actually in the SCR 41. When the predetermined condition is established (Yes), the control process proceeds to S120.

In S120, the change control is executed such that the estimated adsorption amount $NH_{3\ EST}$, which is used for the injection control of urea water, is increased by a predetermined amount α and is thus changed into the adsorption amount change value $NH_{3\ EST}+\alpha$.

In S130, it is determined whether the NOx purification rate of the SCR 41 is decreased by the change control. When the NOx purification rate is decreased (Yes), the control process proceeds to S140 because it is considered that the estimated adsorption amount $NH_{3\ EST}$ before the change has approximated to the actual adsorption amount of $NH_3$. At this time, a correction is executed such that the adsorption amount change value $NH_{3\ EST}+\alpha$ is returned to the estimated adsorption amount $NH_{3\ EST}$ calculated in S110 or is updated to a new adsorption amount update value $NH_{3\ REV}$ to be calculated from the current NOx purification rate, and thus the control process is returned.

On the other hand, when it is determined in S130 described above that the NOx purification rate is not decreased (No), the control process proceeds to S150 because it is considered that the adsorption amount change value $NH_{3\ EST}+\alpha$ after the change approximates to the actual adsorption amount of $NH_3$. At this time, a control to maintain the adsorption amount change value $NH_{3\ EST}+\alpha$ used for the injection control is executed, and thus the control process is returned.

Operational effects of the exhaust purifying system according to this embodiment will be described below.

When the NOx purification rate of the SCR 41 is continuously decreased for a predetermined time or a temporary defect frequently occurs, there is a possibility to cause a difference between the estimated adsorption amount $NH_{3\ EST}$ and the actual adsorption amount of $NH_3$. When the urea water is continuously injected in such a state, there are problems that the urea water is excessively injected and the $NH_3$ slip is caused.

In the exhaust purifying system according to this embodiment, when the predetermined condition is established that can cause the difference between the estimated adsorption amount $NH_{3\ EST}$ and the actual adsorption amount of $NH_3$, the change control is executed such that the estimated adsorption amount $NH_{3\ EST}$ used for the injection control of urea water is increased by the predetermined amount α. Then, the exhaust purifying system according to this embodiment is configured to maintain the adsorption amount change value $NH_{3\ EST}+\alpha$ after the change when the NOx purification rate is not decreased, and to return to the estimated adsorption amount $NH_{3\ EST}$ before the change when the NOx purification rate is decreased, thereby achieving the injection control using the adsorption amount value which is small in difference with respect to the actual adsorption amount of $NH_3$. Therefore, according to the exhaust purifying system of this embodiment, the injection amount of urea water can be optimized, and a $NH_3$ slip can be effectively prevented. Further, since the excessive injection of urea water is suppressed, corrosion of an exhaust pipe or performance deterioration of the SCR 41 caused by adhesion of the urea water can also be effectively prevented.

The invention is not limited to the above-described embodiment, and various changes and modifications may be appropriately made without departing from the scope of the invention.

For example, the estimated-adsorption-amount change unit 53 is configured to increase the estimated adsorption amount $NH_{3\ EST}$ by the predetermined amount α, but may be configured to decrease the estimated adsorption amount $NH_{3\ EST}$ by the predetermined amount α. In addition, the engine 10 is not limited to a diesel engine, but may be widely applicable to other internal combustion engines such as a gasoline engine.

What is claimed is:

1. An exhaust purifying system comprising:
a selective catalytic reduction that is provided in an exhaust passage of an internal combustion engine to purify NOx contained in an exhaust gas using, as a reducing agent, ammonia produced from urea water;
a urea water injection unit that injects the urea water into a portion of the exhaust passage which is upstream from the selective catalytic reduction; and
a controller configured to execute:
calculating an estimated adsorption amount of the ammonia adsorbed in the selective catalytic reduction;
performing an injection control of the urea water injection unit based on the estimated adsorption amount; and
changing the estimated adsorption amount used for the injection control into a value increased or decreased by a predetermined amount when a predetermined condition is established that can cause a difference between an actual adsorption amount of the ammonia adsorbed in the selective catalytic reduction and the estimated adsorption amount, wherein the controller executes:
determining whether an NOx purification rate of the selective catalytic reduction is decreased due to the increase or decrease of the estimated adsorption amount; and
maintaining the value increased or decreased by the controller when the controller determines that the NOx purification rate is not decreased and further wherein the controller executes:
returning the value changed by the controller to the estimated adsorption amount of the ammonia calculated by the controller before the controller changes the estimated adsorption amount when the controller determines that the NOx purification rate has been decreased.

2. An exhaust purifying system comprising:
a selective catalytic reduction that is provided in an exhaust passage of an internal combustion engine to purify NOx contained in an exhaust gas using, as a reducing agent, ammonia produced from urea water;
a urea water injection unit that injects the urea water into a portion of the exhaust passage which is upstream from the selective catalytic reduction; and
a controller configured to execute:
calculating an estimated adsorption amount of the ammonia adsorbed in the selective catalytic reduction;
performing an injection control of the urea water injection unit based on the estimated adsorption amount; and
changing the estimated adsorption amount used for the injection control into a value increased or decreased by a predetermined amount when a predetermined condition is established that can cause a difference between an actual adsorption amount of the ammonia adsorbed in the selective catalytic reduction and the estimated adsorption amount, wherein the controller executes:
determining whether an NOx purification rate of the selective catalytic reduction is decreased due to the increase or decrease of the estimated adsorption amount; and
maintaining the value increased or decreased by the controller when the controller determines that the NOx purification rate is not decreased, and further wherein the controller executes:
correcting the value changed by controller to an estimated adsorption amount calculated by the controller based on a current NOx purification rate when the controller determines that the NOx purification rate has been decreased.

* * * * *